(12) United States Patent
Gunner et al.

(10) Patent No.: US 11,408,216 B2
(45) Date of Patent: Aug. 9, 2022

(54) SYSTEMS AND METHODS FOR CO-PRINTED OR CONCURRENTLY ASSEMBLED HINGE STRUCTURES

(71) Applicant: DIVERGENT TECHNOLOGIES, INC., Los Angeles, CA (US)

(72) Inventors: Jon Paul Gunner, Palos Verdes Estates, CA (US); Narender Shankar Lakshman, Torrance, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 92 days.

(21) Appl. No.: 15/926,847

(22) Filed: Mar. 20, 2018

(65) Prior Publication Data

US 2019/0292821 A1    Sep. 26, 2019

(51) Int. Cl.
*E05D 5/12* (2006.01)
*E05D 3/02* (2006.01)
(Continued)

(52) U.S. Cl.
CPC .............. *E05D 5/12* (2013.01); *E05D 3/02* (2013.01); *B22F 10/20* (2021.01); *B33Y 80/00* (2014.12);
(Continued)

(58) Field of Classification Search
CPC .. E05D 5/10; E05D 5/12; E05D 5/125; E05D 5/127; E05D 2005/102; E05D 2005/106;
(Continued)

(56) References Cited

U.S. PATENT DOCUMENTS 3,349,427 A * 10/1967 Cairns ..................... E05D 3/02
                                                        16/273
3,349,430 A * 10/1967 Rosenvold .............. E05D 5/125
                                                        16/381
(Continued)

FOREIGN PATENT DOCUMENTS

CN    206458199 U    9/2017
DE    3318794 C2    11/1984
(Continued)

OTHER PUBLICATIONS

US 9,202,136 B2, 12/2015, Schmidt et al. (withdrawn)
(Continued)

*Primary Examiner* — Jeffrey O'Brien
(74) *Attorney, Agent, or Firm* — Arentfox Schiff LLP

(57) ABSTRACT

Systems and methods of co-printing a unitary hinge are provided. The unitary hinge may be co-printed using an additive manufacturing process. The unitary hinge includes a hinge pin that is substantially cylindrical in shape. The unitary hinge also includes a knuckle which surrounds a portion of the hinge pin and is configured to be manipulated about the hinge pin. The hinge pin is fabricated in situ with the knuckle such that further assembly is unnecessary. The unitary hinge may also include retention mechanism to retain the hinge within the knuckle without substantially restricting the knuckle from being rotated about the hinge pin. The unitary hinge may further be configured with a fluid port which may, for example, be used to provide a lubricant to an area between the hinge pin and the knuckle or to vacuum powder material or debris from the area.

15 Claims, 6 Drawing Sheets

(51) Int. Cl.
- *B33Y 80/00* (2015.01)
- *E05D 11/02* (2006.01)
- *E05D 5/10* (2006.01)
- *B22F 10/20* (2021.01)

(52) U.S. Cl.
CPC ........ *E05D 11/02* (2013.01); *E05D 2003/027* (2013.01); *E05D 2005/102* (2013.01); *E05D 2005/106* (2013.01); *E05Y 2800/45* (2013.01)

(58) Field of Classification Search
CPC ........ E05D 2005/108; E05D 2005/122; E05D 2005/124
USPC .......................................................... 16/386
See application file for complete search history.

(56) References Cited

U.S. PATENT DOCUMENTS

| | | | |
|---|---|---|---|
| 3,744,085 A * | 7/1973 | Griego | E05D 11/1007 16/325 |
| 3,805,325 A * | 4/1974 | Lee | E05C 19/08 16/262 |
| 3,805,327 A * | 4/1974 | Walker | E05D 5/02 16/383 |
| 4,864,690 A * | 9/1989 | Chen | E05D 5/10 16/276 |
| 4,987,639 A * | 1/1991 | Baiuley | B65D 25/2858 16/222 |
| 5,145,076 A * | 9/1992 | Murphy | B61G 3/04 16/386 |
| 5,203,226 A | 4/1993 | Hongou et al. | |
| 5,630,519 A * | 5/1997 | Burke | B61G 3/04 16/386 |
| 5,742,385 A | 4/1998 | Champa | |
| 5,791,015 A * | 8/1998 | Wandinger | G02C 5/2209 16/228 |
| 5,943,738 A * | 8/1999 | Karfiol | E05D 11/082 16/342 |
| 5,990,444 A | 11/1999 | Costin | |
| 5,991,975 A | 11/1999 | Baer | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,340,800 B2 * | 3/2008 | Gulley | E05D 11/02 16/273 |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,567,013 B2 | 2/2017 | Ehrlich et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |

(56) References Cited

U.S. PATENT DOCUMENTS

| | | |
|---|---|---|
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |

(56) References Cited

U.S. PATENT DOCUMENTS

| | | |
|---|---|---|
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2002/0112319 A1* | 8/2002 | Kida ............... G06F 1/1616 16/342 |
| 2006/0108783 A1 | 5/2006 | Ni et al. |
| 2007/0243358 A1 | 10/2007 | Gandini |
| 2008/0134466 A1* | 6/2008 | Massengill ............... E05D 5/10 16/222 |
| 2010/0101054 A1 | 4/2010 | Cook |
| 2013/0322955 A1 | 12/2013 | Ma |
| 2013/0340373 A1 | 12/2013 | Santiago et al. |
| 2014/0086704 A1 | 3/2014 | Hemingway et al. |
| 2014/0277669 A1 | 9/2014 | Nardi et al. |
| 2016/0237828 A1 | 8/2016 | Burd |
| 2016/0238324 A1 | 8/2016 | Butcher et al. |
| 2017/0096847 A1* | 4/2017 | Liu ............... B33Y 10/00 |
| 2017/0113344 A1 | 4/2017 | Schönberg |
| 2017/0136697 A1 | 5/2017 | Kia |
| 2017/0233997 A1 | 8/2017 | Stevenson |
| 2017/0259502 A1 | 9/2017 | Chapiro |
| 2017/0304946 A1 | 10/2017 | Shibazaki |
| 2017/0341309 A1 | 11/2017 | Piepenbrock et al. |
| 2018/0318929 A1 | 11/2018 | Matthews |
| 2019/0308739 A1* | 10/2019 | Messina ............... B64D 29/06 |

FOREIGN PATENT DOCUMENTS

| | | |
|---|---|---|
| DE | 202016105052 U1 | 6/2017 |
| DE | 102015215695 B4 | 8/2017 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Notification of the Second Office Action received in Chinese Patent Application No. 201821185096.3 dated Aug. 26, 2019, with English Translation.
First Notification to Make Rectifications dated Feb. 11, 2019, regarding China Application No. 201821185096.3.

(56) References Cited

OTHER PUBLICATIONS

International Search Report and Written Opinion dated Jun. 7, 2019, regarding PCT/US2019/022937.
Notification of First Office Action dated May 20, 2019 regarding China Application No. 201821185096.3.

\* cited by examiner

SYSTEMS AND METHODS FOR CO-PRINTED OR CONCURRENTLY ASSEMBLED HINGE STRUCTURES

BACKGROUND

Field

The present disclosure relates generally to techniques for co-printing a hinge system, and more specifically to fabricating a hinge system in which a hinge is fabricated in position within a knuckle.

Background

Additive Manufacturing (AM) processes involve the layer-by-layer buildup of one or more materials to make a 3-dimensional (3-D) object. AM techniques are capable of fabricating complex components from a wide variety of materials. A freestanding object is fabricated by first using a computer aided design (CAD) model. Using the CAD model, the AM process can build the part layer-by-layer, through a variety of AM technologies like Powder Bed Fusion (PBF), material extrusion, vat polymerization, and the like.

Several different printing techniques exist. One such technique is called selective laser melting. Selective laser melting entails fusing (agglomerating) particles of a powder at a temperature below the melting point of the powder material. More specifically, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator.

As AM processes continue to improve, more complex mechanical manufacturers are beginning to investigate the benefits of using additively manufactured parts in their designs. This is because the automotive industry, aircraft manufacturing, and other industries involved in the assembly of transport structures are constantly seeking to improve manufacturing processes through costs savings and by reducing the number of parts that are wasted due to variations that may occur in manufacturing. Joining components that may exhibit minor variations in size is one such area that has proven difficult to overcome. For instance, conventional manufacturing processes provide simple internal designs configured to closely fit around and seal a component in place. However, such structures are limiting in that manufactured components that may be slightly thicker, for example, may be too large and consequently wasted. Each wasted part adds to the manufacturing cost of the product. Due to the inflexibility of the conventionally manufactured designs, a significant amount of waste can occur. This phenomenon drives up the manufacturing cost, which is often passed onto the consumer.

A hinge is a movable joint or mechanical bearing that connects two objects while allowing for rotation between the objects. A hinge system includes a hinge and a knuckle. Hinge systems are broadly applicable. Hinge systems may be used in doors and cabinets in the home, as well as in doors, hoods and trunks of automobiles, for example. Manufacturing the parts of the hinge system may produce significant waste in materials with ever-increasing costs. The manufacturing costs are further increased due to assembly of parts and further modifications thereof. These added costs may make the price of any resultant product prohibitively high.

SUMMARY

Several aspects of a co-printed hinge and methods for manufacturing the co-printed hinge will be described more fully hereinafter.

In an aspect of the present disclosure, an apparatus is presented. The apparatus includes at least two parts coupled together via a unitary hinge comprising a hinge pin and a knuckle, wherein each of the two parts is capable of manipulation relative to the other as a result of concurrent production of the hinge pin within the knuckle.

In another aspect of the present disclosure, a unitary hinge is presented. The unitary hinge includes a hinge pin and a knuckle. The hinge pin is configured to be self-captured within knuckle. The knuckle is configured to be manipulated about the hinge pin.

In an additional aspect of the present disclosure, a unitary hinge is presented. The unitary hinge includes a hinge pin and a knuckle. The unitary hinge also includes a lubricant port configured to provide a lubricant between the hinge pin and the knuckle. The knuckle is also configured to be manipulated about the hinge pin.

In yet another aspect of the present disclosure, a method of manufacturing a unitary hinge is disclosed. The method includes fabricating, using an additive manufacturing (AM) process, the unitary hinge including a hinge pin and a knuckle. The knuckle is configured to be manipulated about the hinge pin. In addition, the hinge pin is fabricated at least partially concurrent with the knuckle at a position within the knuckle.

Other aspects will become readily apparent to those skilled in the art from the following detailed description, wherein is shown and described only several exemplary embodiments by way of illustration. As will be realized by those skilled in the art, concepts described herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of the concepts described herein will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

Aspects of the present disclosure are directed to a co-printed hinge system. The two separate halves of the hinge system may be co-printed or printed in an arrangement together in situ in a single print job. In addition to reducing waste in materials, printing both halves of the hinge system (e.g., a hinge and knuckle) together may also advantageously reduce additional post-assembly processes. This may significantly reduce the time to produce complex assemblies utilizing hinge systems.

Additive manufacturing provides a platform to fabricate intricate, functional parts. In accordance with aspects of the present disclosure, a hinge pin and knuckle of the hinge pin system may be co-printed in an single print operation in an additive manufacturing process. That is, at the completion of the additive manufacturing process, the hinge pin may be printed within the knuckle. Co-printing the hinge pin and knuckle may result in a pre-assembled hinge system upon completion of the print job. Appropriate clearances between the hinge pin and the knuckle may also be provided. In some aspects, a retention mechanism may be included to retain the hinge pin within the knuckle such that translational motion of the parts connected by the hinge is constrained or prevented.

Accordingly, using additive manufacturing, two (or more) parts having a hinge between them may be manufactured in the same print job. In cases where it may be infeasible to print entire parts (due to the support structure requirements, or the excessive size of the parts, for example), alternative embodiments may be employed. For example, the first part that includes the hinge knuckle may be additively manufactured with a hinge pin co-printed into the knuckle. The resulting first part is then simply connected in a secondary operation to the second part by installing the second part to the hinge pin. In either case, the hinge pin and knuckle are fabricated together (i.e. preassembled), and a step in the manufacturing process is thereby eliminated.

Figure 1:
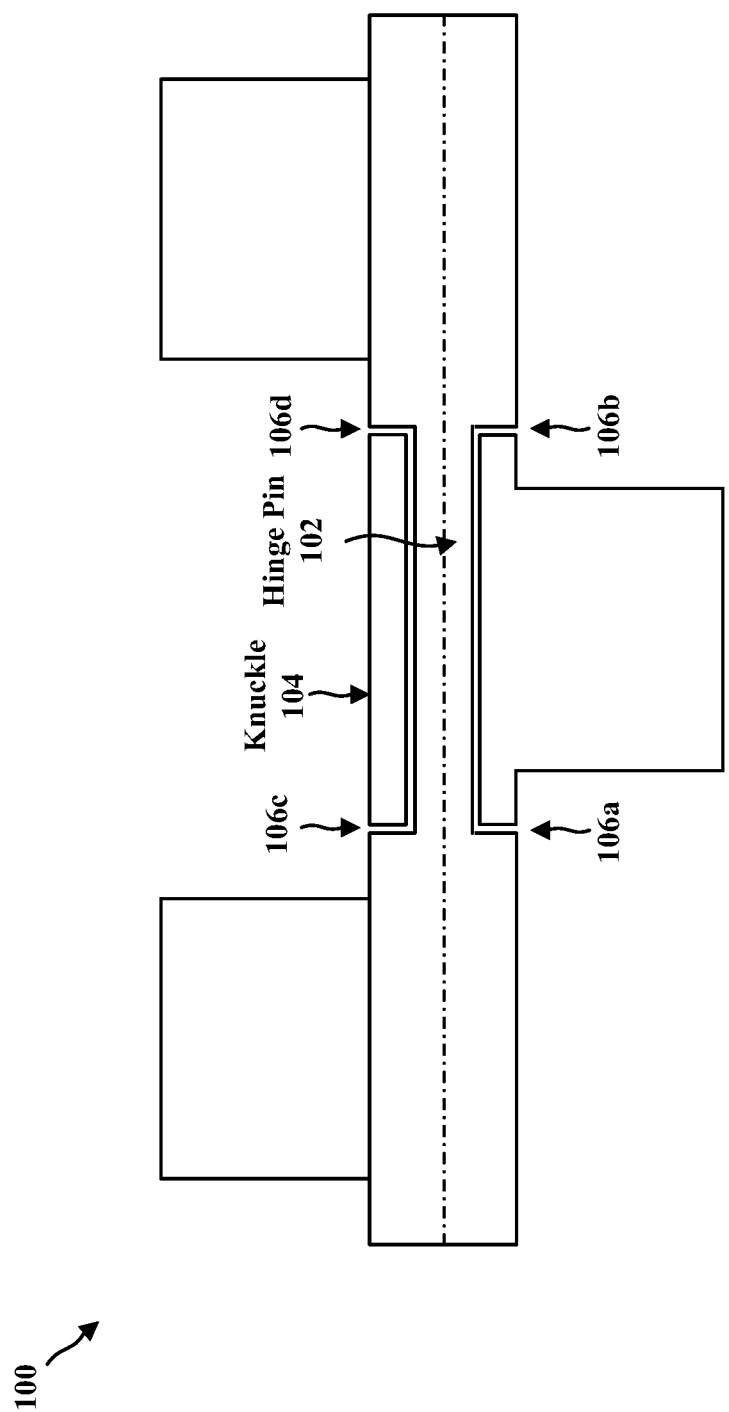
FIG. 1 is a block diagram illustrating a cross-sectional view of an exemplary unitary hinge in accordance with aspects of the present disclosure.

FIG. 1 is a block diagram illustrating a top cross-sectional view of an exemplary unitary hinge in accordance with aspects of the present disclosure. Referring to FIG. 1, the unitary hinge 100 includes a hinge pin 102 and a knuckle 104. The hinge pin 102 and knuckle 104 may be concentric, as indicated via centerline 108. The unitary hinge 100 may be configured with the hinge pin 102 in situ within the knuckle 104. The unitary hinge 100 may be printed together with the hinge pin 102 in operable position with the knuckle 104 using an AM manufacturing process, for example. The hinge pin 102 may be substantially cylindrical in shape. The knuckle 104 may likewise be substantially cylindrical in shape and may be configured to surround at least a portion of the hinge pin 102. The knuckle 104 may also be configured to be manipulated about the hinge pin 102. For instance, knuckle 104 may be rotated about the hinge pin 102. The unitary hinge 100 may also be configured with clearances 106a-d between the hinge pin 102 and the knuckle 104. The clearances may reduce friction between the hinge pin 102 and the knuckle 104 which may result when such parts contact each other and may reduce performance of the unitary hinge.

Figure 2:
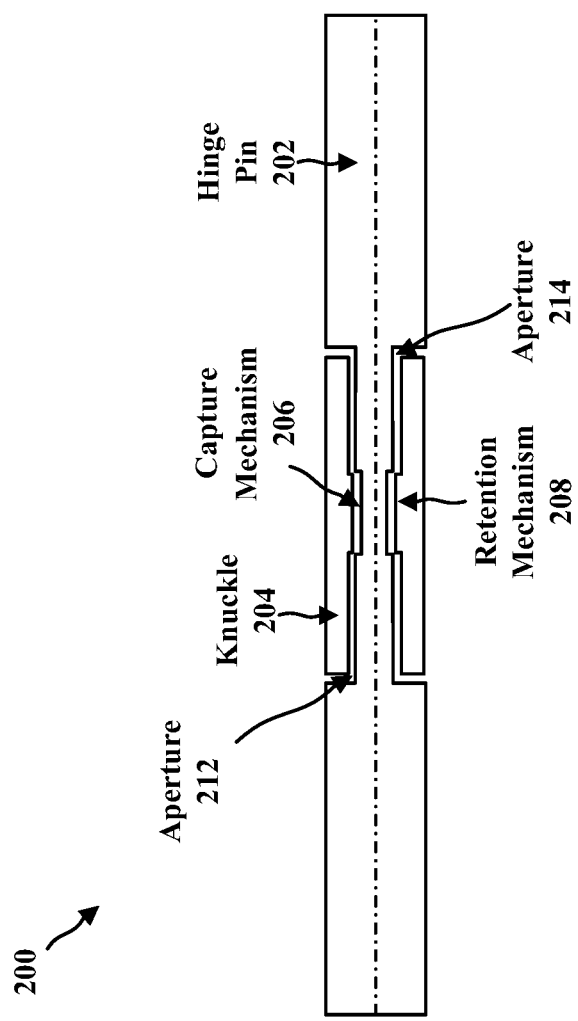
FIG. 2 is a block diagram illustrating a top cross-sectional view of an exemplary unitary hinge with a self-capturing retention mechanism in accordance with aspects of the present disclosure.

FIG. 2 is a block diagram illustrating a top cross-sectional view of an exemplary unitary hinge with a self-capturing retention mechanism in accordance with aspects of the present disclosure. As shown in FIG. 2, the unitary hinge 200 may include a hinge pin 202 and a knuckle 204. The knuckle 204 may be configured to surround a portion of the hinge pin 202. A portion of the hinge pin 202 may extend through apertures 212 and 214 of knuckle 204. In some aspects, the portion of the hinge pin 204 within or surrounded by the knuckle 204 may have a smaller circumference than the portion outside of the knuckle 204.

The hinge pin 202 may be configured with capture mechanism 206. The capture mechanism 206 may be configured as a ring shaped slot or aperture that is concentric with the hinge pin 202. The knuckle 204 may be configured with a corresponding or mating retention mechanism 208. Retention mechanism 208 may be axial and may be positioned along the axis or extend around the hinge pin 202. Although FIG. 2 shows a single capture mechanism 206 and retention mechanism 208 centered on the length of the hinge pin 202, this is merely exemplary and not intended to be limiting. Rather, multiple capture mechanisms 206 and retention mechanisms 208 may be positioned at any portion of the hinge pin 202 and knuckle 204, respectively. Furthermore, while the capture mechanism 206 and the retention mechanism 208 appear to be substantially ring shaped, those of ordinary skill in the art would appreciate after reviewing this disclosure that other shapes may also be used.

The slot portion of the capture mechanism 206 may be configured to abut the retention mechanism 208 such that the hinge pin 202 may be retained within the knuckle 204. That is, the configuration of the capture mechanism 206 and the retention mechanism 208 may substantially restrict and in some aspects, altogether prevent translation of the hinge pin 202 within the knuckle 204 in a direction parallel with the knuckle 204, while still permitting the knuckle 204 to be manipulated or rotated about the hinge pin 202. This configuration may prevent the hinge pin 202 from being displaced or removed from the knuckle 204, thereby compromising the hinge system and structures coupled thereto. Further, friction which could result for the hinge pin 202 contacting the knuckle 204 may be reduced.

The unitary hinge 200 with self-capturing retention mechanism including the hinge pin 202 and knuckle 204 may be printed using an AM manufacturing process. Self-capturing of the hinge pin 202 within the knuckle 204 means that the knuckle 204 need not be fabricated over or around the hinge pin 202 to capture the hinge pin 202 that was fabricated in a previous step. Rather, the hinge pin and knuckle are assembled concurrently such that the hinge pin 202 effectively "finds" itself within the knuckle during the assembly period, and hence is self-captured within the knuckle 204. This procedure is in contrast to conventional techniques which require the knuckle to capture the hinge pin in a second, discrete manufacturing step as described above. The hinge pin 202 and knuckle 204 may be printed together or co-printed with the hinge pin 202 in situ within the knuckle 204. For instance, the unitary hinge 200 may be printed such that the hinge pin 202 is in operable position with the knuckle 204 upon completion of the printing process without further assembly.

Figure 3:
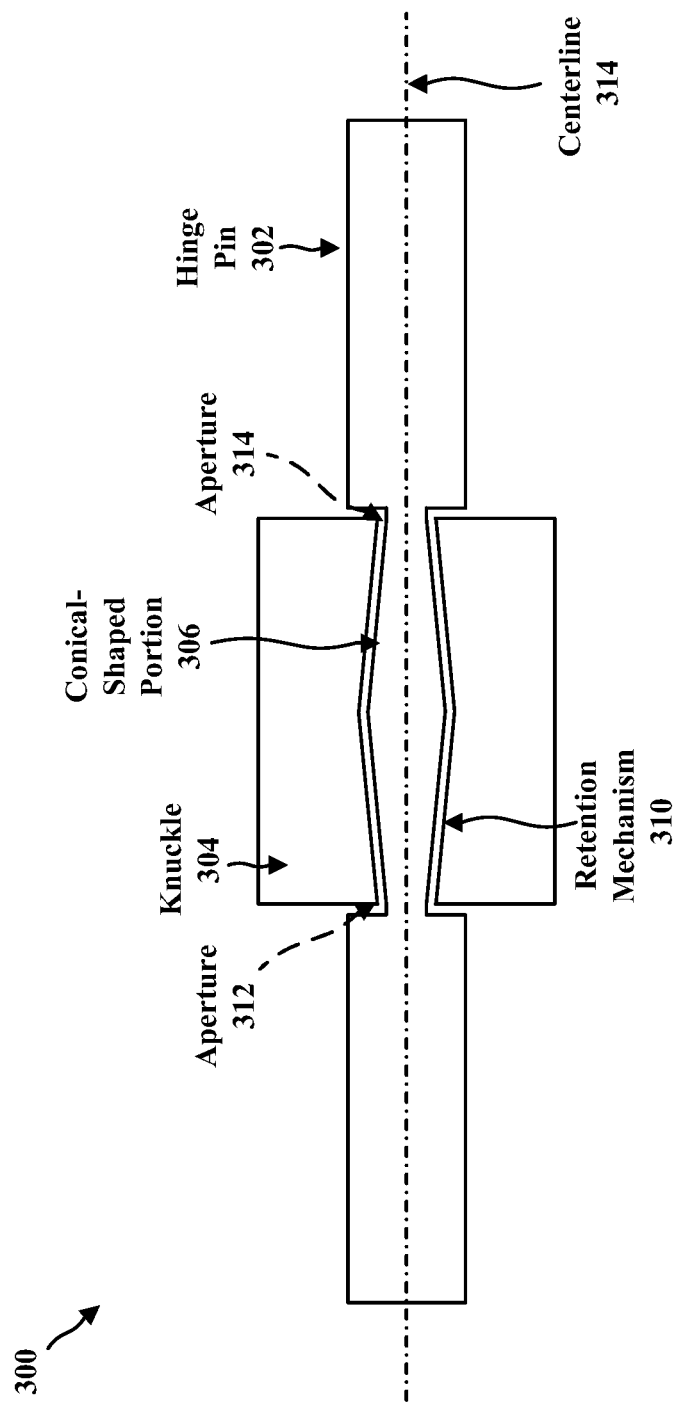
FIG. 3 is a block diagram illustrating a top cross-sectional view of another exemplary unitary hinge with a retention mechanism in accordance with aspects of the present disclosure.

FIG. 3 is a block diagram illustrating a top cross-sectional view of another exemplary unitary hinge with a retention mechanism in accordance with aspects of the present disclosure. As shown in FIG. 3, the unitary hinge 300 may include a hinge pin 302 and a knuckle 304. The hinge pin 302 may be configured with conical shaped portion 306. The knuckle 304 may be configured with a conical retention mechanism 310 in corresponding or mating shape to conical-shaped portion 306. The knuckle 304 may be further configured to surround a portion of the hinge pin 302, with a portion of the hinge pin extending through apertures 312 and 314. The retention mechanism 310 may be configured to retain or capture the hinge pin 302 within the knuckle 304. That is, the retention mechanism 310 may substantially restrict and in some aspects, prevent translation of the hinge pin 302 within the knuckle 304 in a direction parallel with the knuckle 304 (e.g., in a direction along centerline 314), while still permitting the knuckle 304 to be manipulated or rotated about the hinge pin 302. This may prevent the hinge pin 302 from being displaced or removed from the knuckle 304, thereby compromising the hinge system and structures coupled thereto. Further, the retention portion 310 may prevent the hinge pin 302 from sliding within the knuckle 304 or contacting the knuckle 304. As such, friction which could result for the hinge pin 302 contacting the knuckle 304 may be reduced.

The unitary hinge 300 with retention mechanism including the hinge pin 302 and knuckle 304 may be printed using an AM manufacturing process. The hinge pin 302 and knuckle 304 may be printed together or co-printed with the hinge pin 302 in situ within the knuckle 304. For instance, the unitary hinge 300 may be printed such that the hinge pin 302 is in operable position with the knuckle 304 upon completion of the printing process without further assembly.

Figure 4:
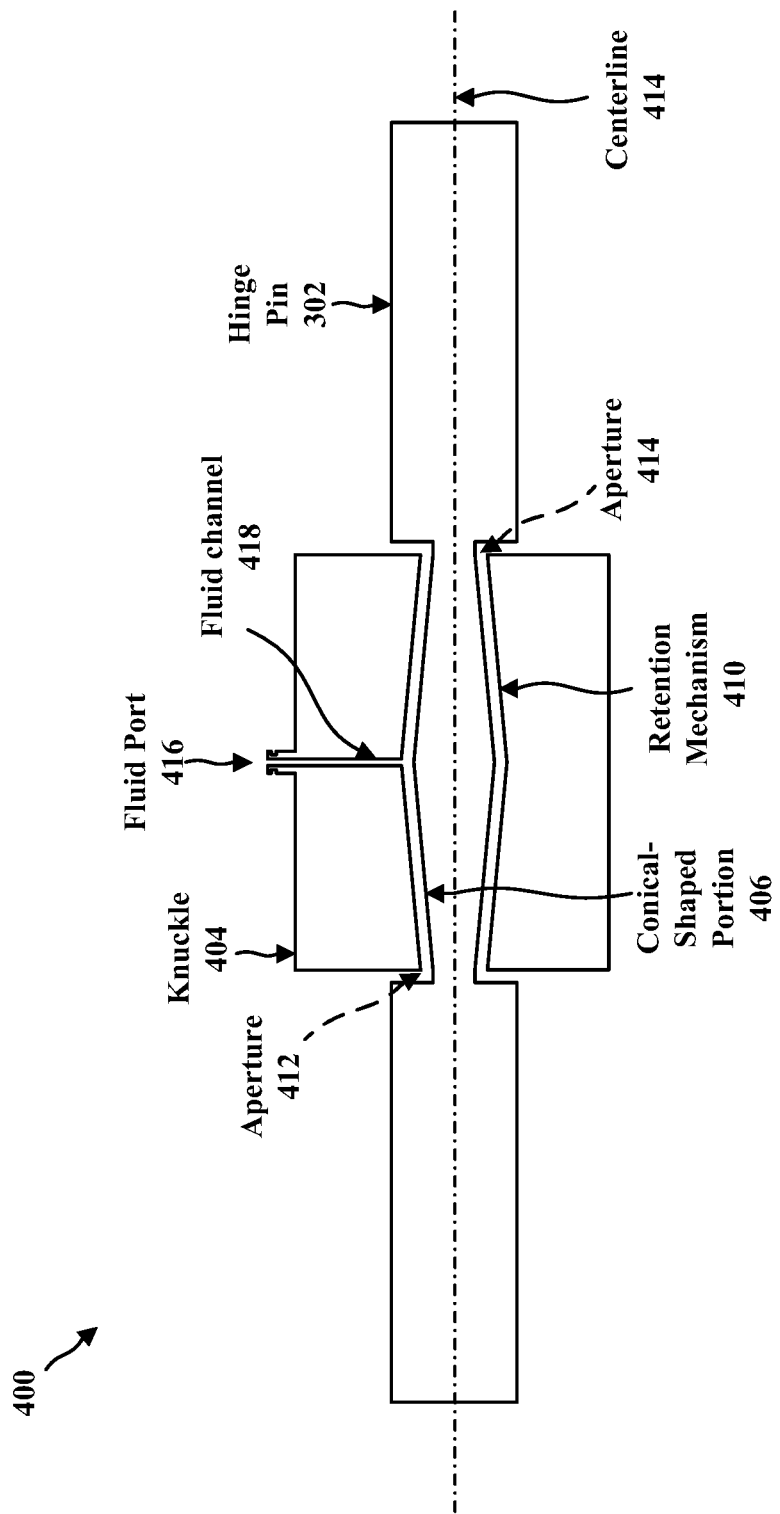
FIG. 4 is a block diagram illustrating a top cross-sectional view of another exemplary unitary hinge with a retention mechanism and a fluid port in accordance with aspects of the present disclosure.

FIG. 4 is a block diagram illustrating a top cross-sectional view of another exemplary unitary hinge with a retention mechanism and a fluid port in accordance with aspects of the present disclosure. As shown in FIG. 4, the unitary hinge 400 may include a hinge pin 402 and a knuckle 404. The knuckle 404 may be further configured to surround a portion of the hinge pin 402, with a portion of the hinge pin extending through apertures 412 and 414. The hinge pin 402 may be configured with conical-shaped portion 406. In some aspects, the hinge pin may be cylindrical in shape, as shown in FIGS. 1 and 2, for example.

The unitary hinge 400 may further include a retention mechanism. The knuckle 404 may be configured with a conical retention portion 410 in corresponding or mating shape to conical shaped portion 406. In some aspects, unitary hinge 400 may alternatively be configured using the capture mechanism and retention mechanism as illustrated for example, in FIG. 2. The retention mechanism 410 may be configured to retain or capture the hinge pin 402 within the knuckle 404. That is, the retention mechanism 410 may substantially restrict, and in some aspects, prevent translation of the hinge pin 402 within the knuckle 404 in a direction parallel with the knuckle 404 (e.g., in a direction along centerline 414), while still permitting the knuckle 404 to be manipulated or rotated about the hinge pin 402.

The unitary hinge 400 may further be configured with a fluid port 416 and a fluid channel 418. The fluid port 416 may be positioned along an external wall of the knuckle 404 or any other external surface of unitary hinge 400. The fluid channel 418 may be coupled to the fluid port 416 and may extend from the fluid port 416 to an area between the hinge pin 402 and the knuckle 404. In some aspects, the fluid port 416 and fluid channel 418 may be configured to receive and distribute or deliver a lubricant or other fluid (e.g., air) to an area or space between the knuckle 404 and the hinge pin 402. In one exemplary aspect, the fluid port 416 and fluid channel may be used to deliver a lubricant substance to the area between the hinge pin 402 and the knuckle to reduce friction between the two components. In another exemplary aspect, the fluid port 416 and fluid channel 418 may deliver an air jet to the space between the hinge pin 402 and knuckle to remove debris or other particles (e.g., un-fused powder material after printing) between the two components.

The unitary hinge 400 with retention mechanism 410, fluid port 416 and fluid channel 418 including the hinge pin 402 and knuckle 404 may be printed using an AM manufacturing process. The hinge pin 402 and knuckle 404 may be printed together or co-printed with the hinge pin 402 in situ within the knuckle 404. For instance, the unitary hinge 400 may be printed such that the hinge pin 402 is in operable position with the knuckle 404 including the retention portion 410, fluid port 416 and fluid channel 418 upon completion of the printing process without further assembly.

Figure 5:
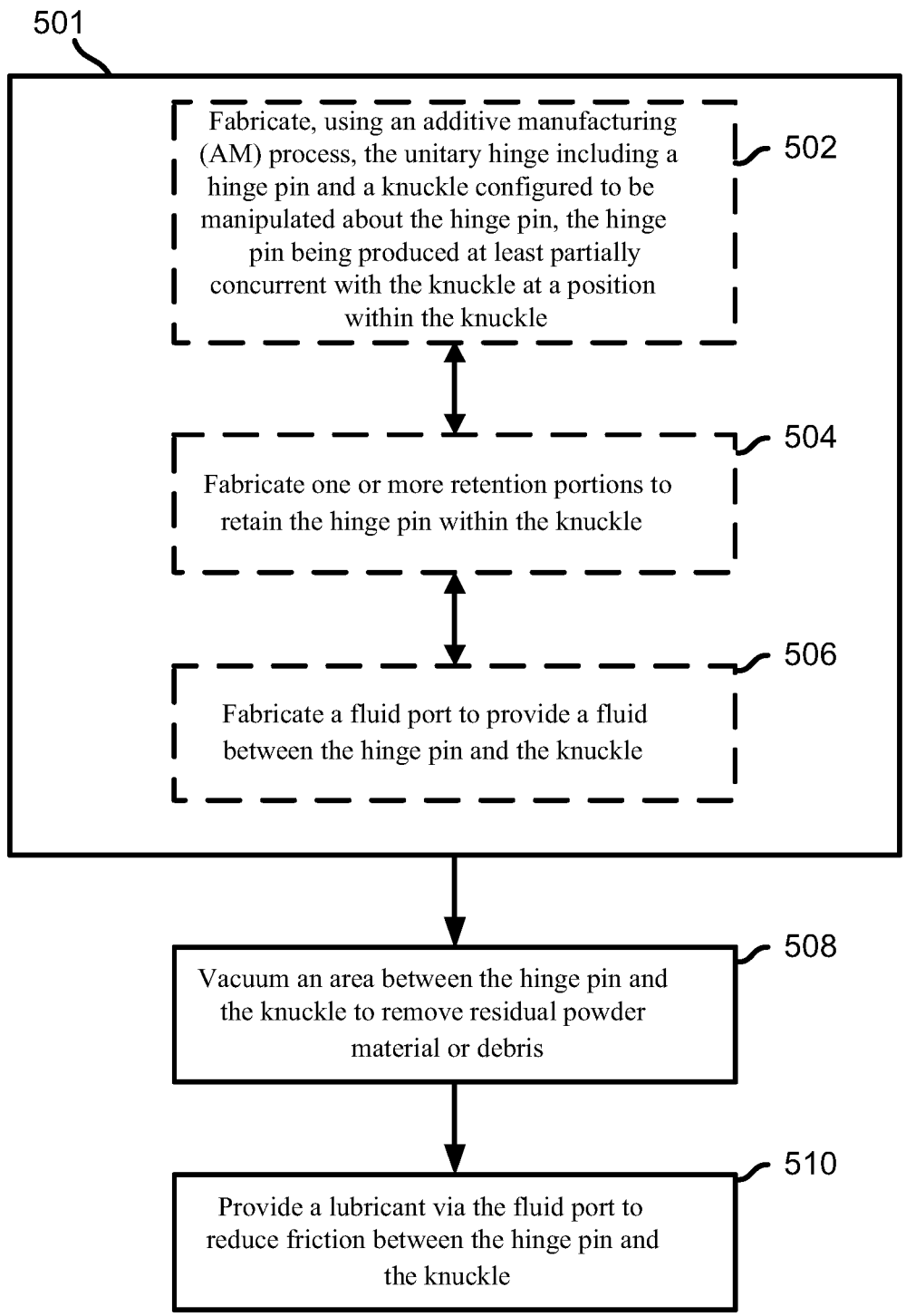
FIG. 5 is a flowchart of an exemplary method of manufacturing a unitary hinge in accordance with aspects of the present disclosure.

FIG. 5 is a flowchart of an exemplary method of manufacturing a unitary hinge in accordance with aspects of the present disclosure. An additive manufacturing process may be used to fabricate or print the unitary hinge (501). The dashed lines and bi-directional arrows of block 501 are present to illustrate that the steps 502, 504 and 506 may be performed in a single manufacturing step. That is, the unitary hinge may be fabricated in a single print process and include a hinge pin and a knuckle configured to be manipulate about the hinge pin. The hinge pin is fabricated at position within the knuckle. For example, as shown in FIG. 1, the hinge pin 102 is positioned within the knuckle 104. The hinge pin 102 and the knuckle 104 are concentric such that the knuckle 104 may be rotated around the hinge pin 102.

In block 504, the AM process may be used to fabricate one or more retention portions to retain the hinge pin within the knuckle. In some aspects, the retention portion may be an axial retention portion that substantially restricts movement of the hinge pin in a direction parallel to the knuckle and permitting the knuckle to rotate around the hinge pin. For example, as shown in FIG. 2, the hinge pin 202 may be configured with capture mechanism 206. The capture mechanism 206 may be configured as a ring shaped slot or aperture that is concentric with the hinge pin 202. The knuckle 204 may be configured with a corresponding or mating retention mechanism 208. Retention mechanism 208 may be axial and may be positioned along the axis or extend around the hinge pin 202. The slot portion of the capture mechanism 206 may be configured to abut the retention mechanism 208 such that the hinge pin 202 may be retained within the knuckle 204. That is, the configuration of the capture mechanism 206 and the retention mechanism 208 may substantially restrict and in some aspects, prevent translation of the hinge pin 202 within the knuckle 204 in a direction parallel with the knuckle 204, while still permitting the knuckle 204 to be manipulated or rotated about the hinge pin 202.

In some aspects, the retention portion may be a conical in shape to substantially restrict movement of the hinge pin in a direction parallel to the knuckle. For instance, as shown in FIG. 3, the hinge may be configured with a conical-shaped portion 306 and the knuckle 304 may be configured with a conical retention mechanism 310. The conical retention mechanism 310 may configured to correspond to or mate with the conical-shaped portion 306. The retention mechanism 310 may be configured to retain the hinge pin 302 within the knuckle 304. Furthermore, the retention mechanism 310 may substantially restrict and in some aspects, prevent translation of the hinge pin 302 within the knuckle 304 in a direction parallel with the knuckle 304 (e.g., in a direction along centerline 314), while still permitting the knuckle 304 to be manipulated or rotated about the hinge pin 302.

In block 506, a fluid port may be fabricated and configured to provide a fluid between the hinge pin and the knuckle. In block 508, an area between the hinge pin and the knuckle may be vacuumed to remove residual powder material or debris. In some aspects, another fluid may be injected (air) to remove the residual powder material or debris. In block 510, a lubricant may be provided via the fluid port to reduce friction between the hinge pin and the knuckle. For example, as illustrated in FIG. 4, the unitary hinge 400 may include a fluid port 416 and a fluid channel 418. The fluid port 416 may be positioned along an external wall of the knuckle 404 or any other external surface of unitary hinge 400. The fluid channel 418 may be coupled to the lubricant port 416 and may extend from the lubricant port 416 to an area between the hinge pin 402 and the knuckle 404. In some aspects, the fluid port 416 and fluid channel 418 may be configured to receive and distribute or deliver a lubricant or other fluid (e.g., air) to an area or space between the knuckle 404 and the hinge pin 402. In one exemplary aspect, the fluid port 416 and fluid channel may be used to deliver a lubricant substance to the area between the hinge pin 402 and the knuckle to reduce friction between the two components. In another exemplary aspect, the fluid port 416 and fluid channel 418 may deliver air to the space between the hinge pin 402 and knuckle to remove debris or other particles (e.g., unmelted powder material after printing) between the two components.

Figure 6B:
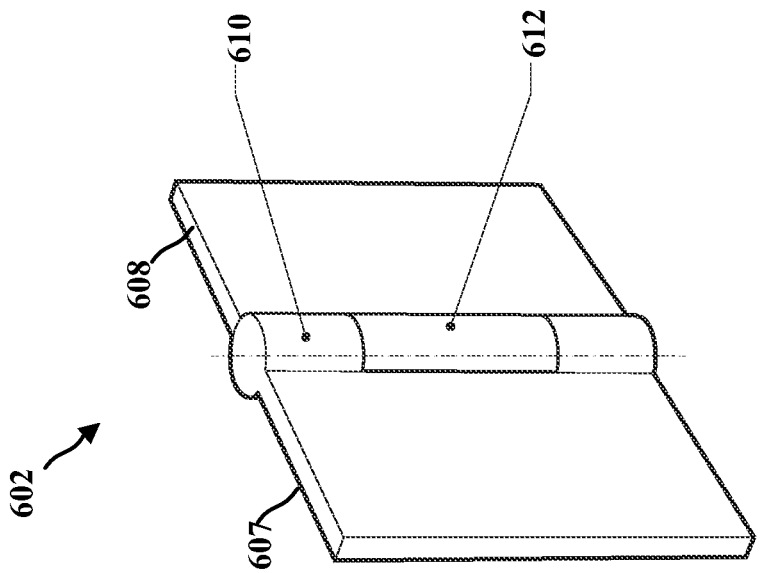
FIG. 6B is a perspective view of two parts joined by a hinge pin and a knuckle.
Figure 6A:
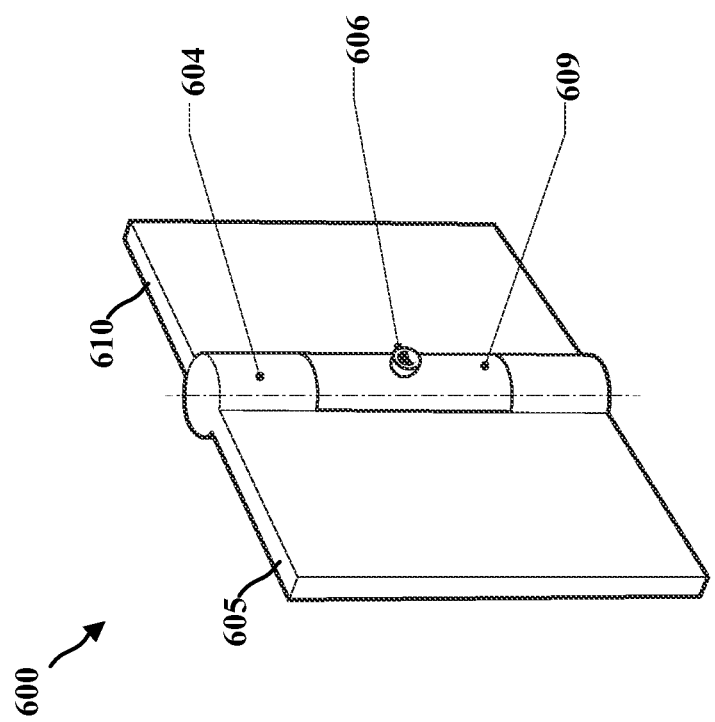
FIG. 6A is a perspective view of two parts joined by a hinge pin and a knuckle and having a fluid port in accordance with aspects of the present disclosure.

FIG. 6A is a perspective view 600 of two generic parts 605 and 610 joined together by a concurrently assembled hinge pin 604 and knuckle 609, in accordance with an embodiment. The knuckle 609 further includes a fluid port 606. FIG. 6B is a similar perspective view 602 of two parts 607 and 608 with hinge pin 610 and knuckle 612, but without the fluid port. In FIG. 6A, parts 605 and 610 may be any structure for which hinge operation is needed such as, for example, two sides of a panel. In FIG. 6A, parts 605 and 610 may be similarly situated. A point to be illustrated in FIGS. 6A and B is that whatever the parts are, the hinge pin and knuckle can be concurrently assembled with the two adjoining parts to entirely obviate an extra required step. For example, the adjoining parts can be co-printed along with the hinge pin and knuckle, thereby allowing for a structure that allows movement between parts 605 and 610 (FIG. 6A) relative to one another without requiring an additional production step of fabricating a hinge pin to fit around a knuckle.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other hinge systems and methods for manufacturing such hinges. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
   at least two parts coupled together via a unitary hinge comprising a hinge pin and a knuckle,
   wherein each of the at least two parts is capable of manipulation relative to another of the at least two parts as a result of concurrent production of the hinge pin within the knuckle,
   wherein the hinge pin comprises a conical shaped portion having a first conical shaped portion and a second conical shaped portion, each of the first and second conical shaped portions having a first end with a first diameter extending to a second end with a second diameter, wherein the first diameter of the first end is greater than the second diameter of the second end, and wherein the first end of each of the first and second conical shaped portions are connected to define a peak of the conical shaped portion, and
   wherein the knuckle comprises a conical retention mechanism corresponding to the conical shaped portion and configured to rotatably capture the hinge pin within the knuckle and wherein a surface of the conical retention mechanism limits translation of the hinge pin relative to the knuckle in a direction parallel with the knuckle.

2. The apparatus of claim 1, wherein the at least two parts are co-printed with the hinge pin and the knuckle.

3. The apparatus of claim 1, wherein the surface of the conical retention mechanism includes a vertex that interacts with the conical shaped portion to reduce friction between respective ends of the hinge pin and corresponding sides of the knuckle.

4. The apparatus of claim 1, wherein the knuckle has a body with a cylindrical shape surrounding the conical shaped portion of the hinge pin to retain the hinge pin within the knuckle.

5. The apparatus of claim 1, wherein at least one of:
   the conical shaped portion is positioned at a center of the hinge pin, or
   the conical retention mechanism is positioned at a center of the knuckle.

6. The apparatus of claim 1, wherein the conical retention mechanism includes a surface that defines at least one aperture at at least one end of the knuckle, wherein a portion of the hinge pin extends through the at least one aperture.

7. The apparatus of claim 1, wherein the knuckle includes a first side and an opposing second side, wherein the hinge pin includes a first end and a second end connected by the conical shaped portion, and wherein the surface of the conical retention mechanism is shaped to prevent contact between at least one of the first side or the second side of the knuckle and a corresponding one of the first end or the second end of the hinge pin.

8. The apparatus of claim 1, wherein the peak is in a center of the conical shaped portion.

9. A unitary hinge, comprising:
   a hinge pin comprising a conical shaped portion having a first conical shaped portion and a second conical shaped portion, each of the first and second conical shaped portions having a first end with a first diameter extending to a second end with a second diameter, wherein the first diameter is greater than the second diameter, and wherein the first end of each of the first and second conical shaped portions are connected to define a peak of the conical shaped portion; and
   a knuckle comprising a conical retention mechanism corresponding to the conical shaped portion, the hinge pin being rotatably self-captured within the knuckle by the conical retention mechanism within the conical shaped portion, and the knuckle being configured to be manipulated about the hinge pin to enable a concurrent manipulation of parts coupled to the hinge pin and wherein a surface of the conical retention mechanism limits translation of the hinge pin relative to the knuckle in a direction parallel with the knuckle.

10. The unitary hinge of claim 9, wherein the conical shaped portion is positioned on an external surface of the hinge pin.

11. The unitary hinge of claim 9, wherein at least one of:
    the conical shaped portion is positioned at a center of the hinge pin, or
    the conical retention mechanism is positioned at a center of the knuckle.

12. The unitary hinge of claim 9, wherein the conical retention mechanism includes a surface that defines at least one aperture at at least one end of the knuckle, wherein a portion of the hinge pin extends through the at least one aperture.

13. The unitary hinge of claim 9, wherein the knuckle includes a first side and an opposing second side, wherein the hinge pin includes a first end and a second end connected by the conical shaped portion, and wherein the surface of the conical retention mechanism is shaped to prevent contact between at least one of the first side or the second side of the knuckle and a corresponding one of the first end or the second end of the hinge pin.

14. The unitary hinge of claim 9, wherein the peak is in a center of the conical shaped portion.

15. The unitary hinge of claim 9, wherein the conical retention mechanism of the knuckle comprises a first conical retention mechanism portion and a second retention mechanism portion, each of the first and second conical retention mechanism portions having a first retention mechanism end with a first retention mechanism end diameter extending to a second retention mechanism end with a second retention mechanism end diameter, wherein the first retention mechanism end diameter is greater than the second retention mechanism end diameter, and wherein the first retention mechanism end of each of the first and second conical retention mechanism portions are connected to define a vertex of the conical retention mechanism portion.

\* \* \* \* \*